US010775633B1

(12) United States Patent
Lee et al.

(10) Patent No.: US 10,775,633 B1
(45) Date of Patent: Sep. 15, 2020

(54) EXIT PUPIL STEERING FOR NEAR-EYE DISPLAYS

(71) Applicant: Facebook Technologies, LLC, Menlo Park, CA (US)

(72) Inventors: Hee Yoon Lee, Redmond, WA (US); Douglas Robert Lanman, Bellevue, WA (US); Nicholas Daniel Trail, Bothell, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 256 days.

(21) Appl. No.: 15/950,006

(22) Filed: Apr. 10, 2018

(51) Int. Cl.
*G02B 27/01* (2006.01)

(52) U.S. Cl.
CPC ..... *G02B 27/0179* (2013.01); *G02B 27/0172* (2013.01); *G02B 2027/0174* (2013.01); *G02B 2027/0187* (2013.01)

(58) Field of Classification Search
None
See application file for complete search history.

(56) References Cited

U.S. PATENT DOCUMENTS

| 2014/0036361 A1* | 2/2014 | Woodgate | G02B 6/0068 |
| | | | 359/466 |
| 2016/0238845 A1* | 8/2016 | Alexander | G03H 1/2645 |
| 2016/0327796 A1* | 11/2016 | Bailey | G02B 27/0172 |
| 2019/0212699 A1* | 7/2019 | Waldern | G02B 6/00 |

* cited by examiner

*Primary Examiner* — Jennifer D. Carruth
(74) *Attorney, Agent, or Firm* — Fenwick & West LLP

(57) ABSTRACT

A near eye display (NED) includes an eye tracking system and a steering element. The eye tracking system tracks the location of a very small eyebox that is approximately the size of a user's pupil or smaller and provides this information to the steering element (e.g., MEMS, plurality of sources, liquid crystal prism, etc.). The very small eyebox provides for a very wide field of view and is optically efficient. The steering element adjusts the direction of light output (i.e., the exit pupil) from the NED such that it is directed toward the tracked location (i.e., a relatively small eyebox).

17 Claims, 8 Drawing Sheets

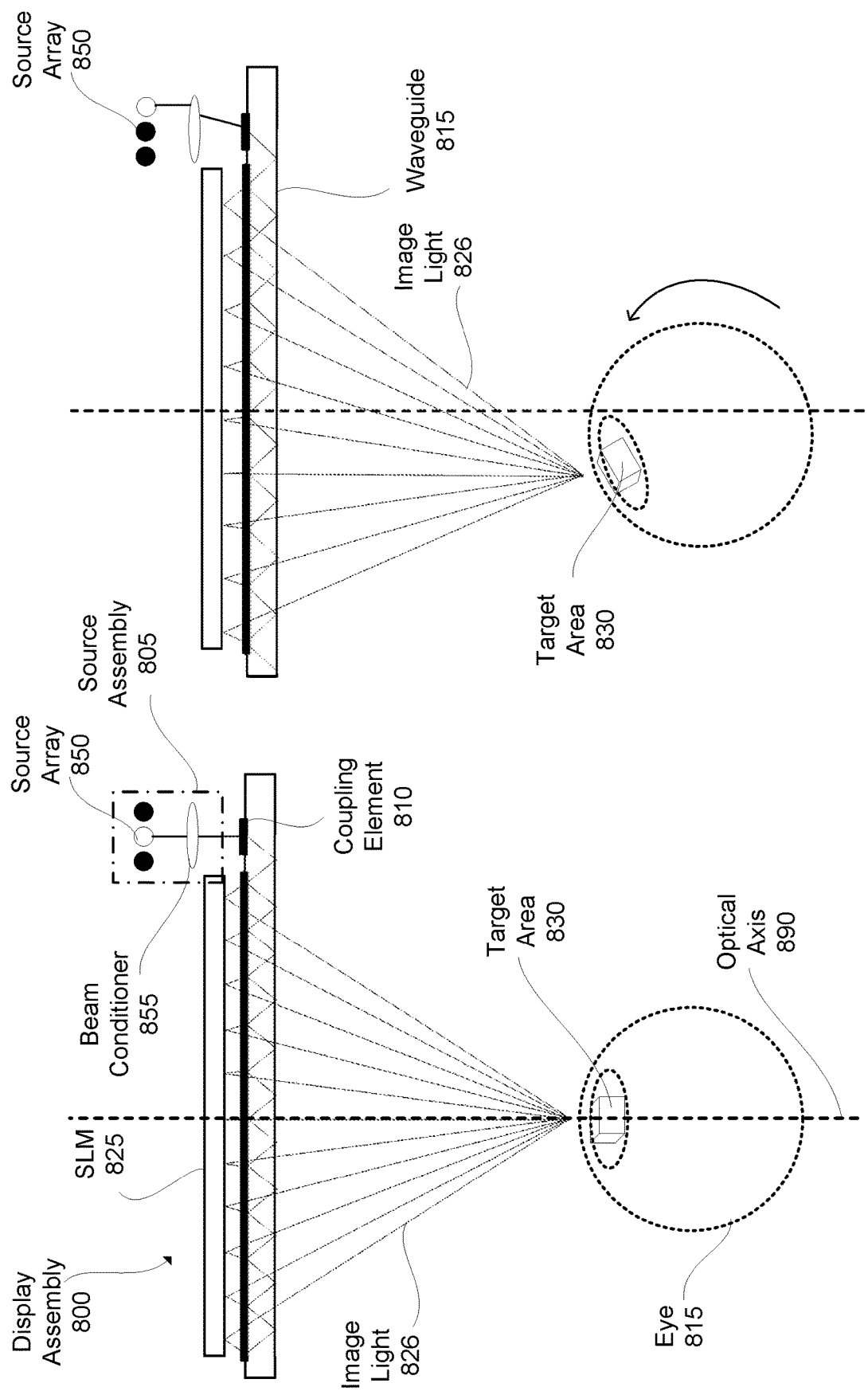

EXIT PUPIL STEERING FOR NEAR-EYE DISPLAYS

BACKGROUND

The present disclosure generally relates to near-eye display (NED) systems, and more specifically to exit pupil steering for near-eye displays, and in particular near-eye holographic displays.

Near-eye light field displays project images directly into a user's eye, encompassing both near-eye displays (NEDs) and electronic viewfinders. Conventional near-eye displays (NEDs) generally have a display element that generates image light that passes through one or more lenses before reaching the user's eyes. Additionally, NEDs in virtual reality systems and/or augmented reality systems have a design criteria to be compact and light weight, and to provide a two-dimensional expansion with a large eyebox and a wide field-of-view (FOV) for ease of use. In typical NEDs, the limit for the FOV is based on satisfying two physical conditions: (1) an occurrence of total internal reflection of image light coupled into a waveguide and (2) an existence of a first order diffraction caused by a diffraction grating element. Conventional methods used by the NEDs based on a diffraction grating rely on satisfying the above two physical conditions in order to achieve a large FOV (e.g. above 40 degrees) by using materials with a high refractive index, and thus, adds significantly heavy and expensive components to the NEDs. Furthermore, designing a conventional NED with two-dimensional expansion involving two different output grating elements that are spatially separated often result in a large form factor. Accordingly, it is very challenging to design NEDs using conventional methods to achieve a small form factor, a large FOV, and a large eyebox.

SUMMARY

A near-eye display (NED) includes a display, such as a holographic display, for presenting media to a user. The display includes a light source assembly, an output waveguide, a spatial light modulator (SLM), and a controller. The NED additionally includes and eye tracking system and a steering element (e.g., MEMS, plurality of sources, liquid crystal prism, etc.). The eye tracking system tracks the location of a very small eyebox that is approximately the size of a user's pupil (or smaller) and provides this information to the steering element, which adjusts the direction of light output (i.e., the exit pupil) from the NED such that it is directed toward the tracked location (i.e., a relatively small eyebox). The very small eyebox provides for a very wide field of view and is optically efficient.

In some embodiments, the steering element of the NED includes a point source, a collimator, and a steering element (e.g., MEMS, Liquid Crystal (LC) Prism, scanning mirror, etc.) to steer the image light to very small eyebox or target area. The point source generates the image light, the collimator collimates the image light from the point source, and the steering element receives the collimated image light and steers the light by changing at least one of the orientation or position of the image light before the image light is in-coupled into the waveguide. The change in orientation or position applied to the image light by the steering element causes the output image light to be steered toward target area in response to changes in the user's eye position. In one embodiment, changing the orientation or position of the image light includes changing the angle at which the image light is incident relative to an in-coupling element of the waveguide.

In another example, the steering element includes a projector lens and source array to steer the image light to the target area. The source array generates the image light and, depending on which pixels are illuminated in the array, steers the image light being in-coupled into the waveguide. Accordingly, depending on the pixels (or combination of pixels) that are illuminated in source array, causes directional changes of the output image light upon being out-coupled from the waveguide, thereby, steering the image light toward target area in response to changes in the user's eye position.

The steering element may also include a liquid crystal (LC) prism that receives the image light out-coupled from the waveguide to steers the image light to the target area. A source assembly, in this embodiment, generates the image light, which is in-coupled into the waveguide and out-coupled by an output grating of the waveguide to LC prism. The LC prism then steers the image light (e.g., via a patterned electrode of LC prism having refractive shapes), in this embodiment, before the image light is received by the SLM.

Moreover, various configurations may be employed to focus the image light onto the target area. These focusing methods include chirping an output grating of the waveguide, adding a lens as a component in the display assembly (i.e., along the optical path), curving the display assembly, or some combination thereof.

BRIEF DESCRIPTION OF THE DRAWINGS

FIGS. 8A and 8B illustrate another set of cross-sections of a display assembly of an NED showing another configuration for steering image light to a target area of an exit pupil of the NED, in accordance with one embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

A display, such as a holographic display, is used for presenting media to a user. In some embodiments, the display is incorporated into, e.g., a near-eye-display (NED) as part of an artificial reality system. The display includes a light source assembly, an output waveguide, a spatial light modulator (SLM), and a controller. The NED additionally includes and eye tracking system and a steering element (e.g., MEMS, plurality of sources, liquid crystal prism, etc.). The eye tracking system tracks the location of a very small eyebox that is approximately the size of a user's pupil (or smaller) and provides this information to the steering element, which adjusts the direction of light output (i.e., the exit pupil) from the NED such that it is directed toward the tracked location (i.e., a relatively small eyebox). The very small eyebox provides for a very wide field of view and is optically efficient.

Figure 1:
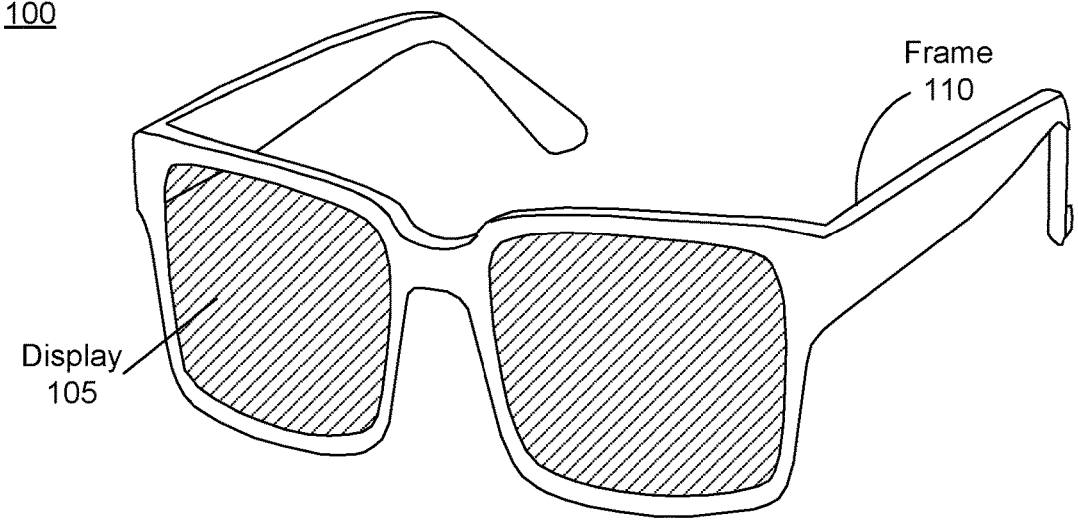
FIG. 1 is a diagram of a near-eye display (NED), in accordance with one embodiment.

FIG. 1 is a diagram of a near-eye-display (NED) 100, in accordance with an embodiment. In some embodiments, the NED 100 may be referred to as a head-mounted display (HMD). The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as an artificial reality NED. In some embodiments, the NED 100 may be modified to also operate as an augmented reality VR NED, an (AR) NED, a mixed reality (MR) NED, or some combination thereof. For example, in some embodiments, the NED 100 may augment views of a physical, real-world environment with computer-generated elements (e.g., images, video, sound, etc.).

The NED 100 shown in FIG. 1 includes a frame 110 and a holographic display 105. The frame 110 is coupled to one or more optical elements which together display media to users. In some embodiments, the frame 110 may represent a frame of eye-wear glasses. The display 105 is configured for users to see the content presented by the NED 100. As discussed below in conjunction with FIG. 2, the display 105 includes at least one display assembly (not shown) for directing one or more image light to an eye of the user. The display assembly includes, e.g., a holographic display, a waveguide display, a stacked waveguide display, a varifocal waveguide display, or some combination thereof. As used herein, a holographic display is a type of waveguide display, but a waveguide display is not necessarily a holographic display. The stacked waveguide display is a polychromatic display created by stacking waveguide displays whose respective monochromatic sources are of different colors. The stacked waveguide display is also a polychromatic display that can be projected on multiple planes (e.g. multi-planar display). The varifocal waveguide display is a display that can adjust a focal position of image light emitted from the waveguide display.

Figure 2:
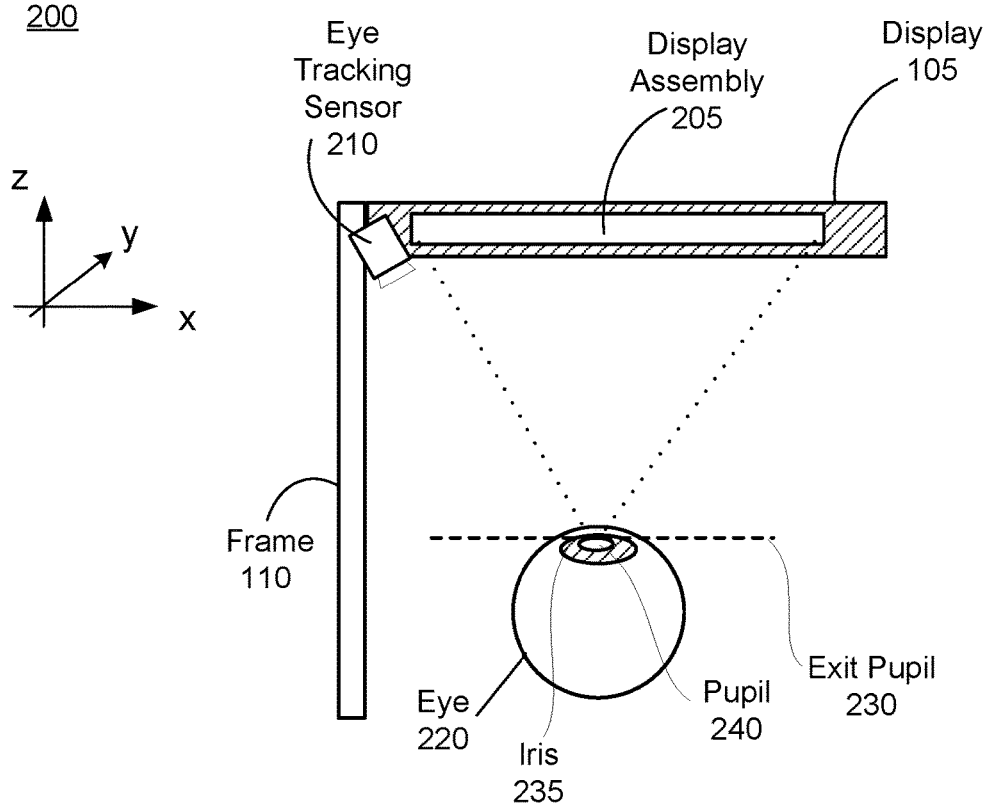
FIG. 2 is a cross-section of an eyewear of the NED in FIG. 1 showing an eye of a user, in accordance with one embodiment.

FIG. 2 is a cross-section 200 of the NED 100 illustrated in FIG. 1, in accordance with an embodiment. The display 105 includes at least one display assembly 205 and at least one eye tracking sensor 210. An exit pupil 230 is a location where the eye 220 is positioned in an eyebox region when the user wears the NED 100. For purposes of illustration, FIG. 2 shows the cross section 200 associated with a single eye 220 and a single display assembly 205, but in alternative embodiments not shown, another display assembly which is separate from the display assembly 205 shown in FIG. 2, provides image light to an eyebox located at an exit pupil of another eye 220 of the user. As shown in FIG. 2, eye 220 includes iris 235 and pupil 240.

The display assembly 205, as illustrated below in FIG. 2, is configured to direct the image light to an eyebox located at an exit pupil 230 of the eye 220. In one embodiment, the display 105 is a holographic near eye display. Holographic displays are capable of generating a true wavefront of 3D objects with no vergence-accommodation conflict and only with diffraction limited resolution. Holographic displays, in one embodiment, use a spatial light modulator (SLM) to recreate the wavefront by modulating the amplitude and/or the phase of the image light of 3D virtual objects behind the display 105.

The display assembly 205 may be composed of one or more materials (e.g., plastic, glass, etc.) with one or more refractive indices that effectively minimize the weight and, in some embodiments, widen a field of view (hereinafter abbreviated as 'FOV') of the NED 100. In alternate configurations, the NED 100 includes one or more optical elements between the display assembly 205 and the eye 220. The optical elements may act to, e.g., correct aberrations in image light emitted from the display assembly 205, magnify image light emitted from the display assembly 205, some other optical adjustment of image light emitted from the display assembly 205, or some combination thereof (e.g., as further described below with regard to FIGS. 4-6). The example for optical elements may include an aperture, a Fresnel lens, a convex lens, a concave lens, a filter, waveguide chirping, waveguide curving, or any other suitable optical element that affects image light.

In some embodiments, the display assembly 205 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g. multi-planar colored display). In some configurations, the stacked waveguide display is a monochromatic display that can be projected on multiple planes (e.g. multi-planar monochromatic display). The varifocal waveguide display is a display that can adjust a focal position of image light emitted from the waveguide display. In alternate embodiments, the display assembly 205 may include the stacked waveguide display and the varifocal waveguide display.

Given limited number of pixels (e.g., <8M=2 k*4 k) in an SLM, there's a trade-off between the FOV and the size of the eyebox. For example, a 20 mm eyebox equates to roughly a FOV of 6 degrees and a 10 mm eyebox equates to roughly a FOV of 12 degree. Since the pupil 240 is relatively small (e.g., ~2 mm), a 20 mm eyebox is not a very efficient use of optical power. Accordingly, by shrinking or de-magnifying the size of the eyebox (e.g., between 1.0 mm and 3.0 mm in diameter), NED 100 can use an SLM that is devoid of any symptoms of vergence-accommodation conflict while additionally increasing the FOV of NED 100. For example, with an approximately 2.0 mm sized eyebox, the FOV can be as large as 70+ degrees with 4 k pixels in 1D. Similarly, an approximately 1.5 mm sized eyebox can achieve a FOV as large as 100+ degrees with 4 k pixels in 1D. However, the eye position changes as a user rotates their eye to look in different directions and a rotation of the eye a few degrees with such a small eyebox (i.e., one the size of the pupil 240 itself) would cause the user's pupil 240 to move off the eyebox. Thus, in one embodiment, eye tracking sensor 210 tracks the position of the pupil 240 and a steering element (e.g., as further described below with regard to FIGS. 7-9) adjusts the location of the small eyebox or target area corresponding to the pupil 240 by directing the image light to the target area or pupil (i.e., the pupil 240 roughly corresponding to the target area) as the position of the pupil 240 changes. Accordingly, the eye tracking sensor 210 tracks the location of a very small eyebox that is about the size of the user's pupil 240 or smaller and provides this information to the steering element to guide image light from display 105 to the small eyebox. The very small eyebox provides for a very wide field of view and is very optically efficient. The steering element adjusts the direction of light output from display 205 from the NED 100 such that it is directed toward the tracked location or target area (i.e., the relatively small eyebox).

Figure 3:
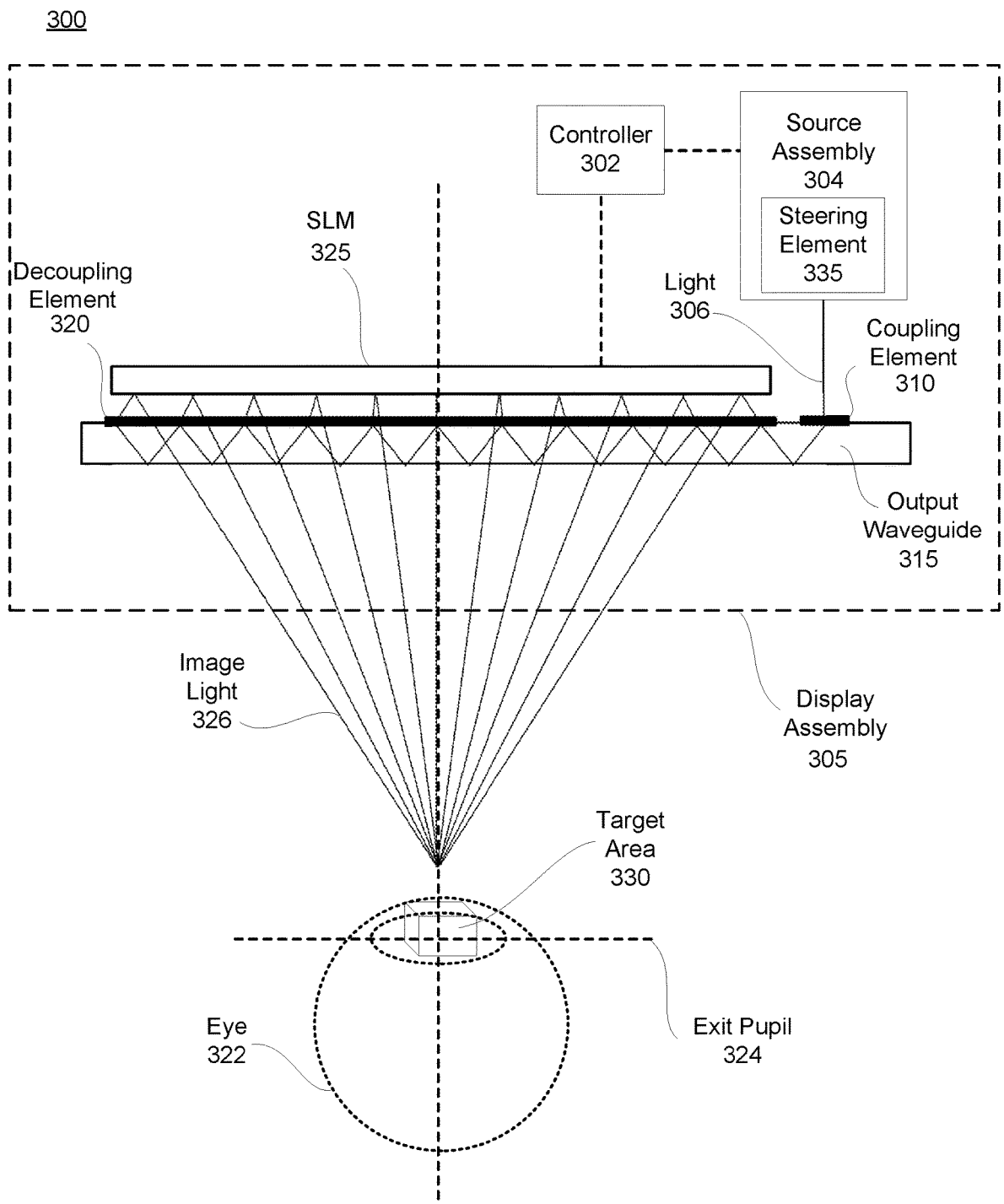
FIG. 3 illustrates a cross-section of a display assembly of an NED, in accordance with one embodiment.

FIG. 3 illustrates a cross-section 300 of display assembly 305, in accordance with one embodiment. In some embodiments, the display assembly 305 is an embodiment of display assembly 205. The display assembly 305 includes a controller 302, a source assembly 304, an output waveguide 315, steering element 335, and a spatial light modulator (SLM) 325. For purposes of illustration, FIG. 3 shows the display assembly 305 associated with a single eye 322, but in some embodiments, another display separate (or partially separate) from the display assembly 305, provides image light to another eye of the user. In a partially separate system, one or more components may be shared between displays for each eye.

The source assembly 304 generates light 306. The source assembly 304 includes an optical source (e.g., laser diode, a vertical cavity surface emitting laser, a light emitting diode, such as uLED, SLED, etc., a tunable laser, or some other light source that emits coherent or partially coherent light, etc.), and an optical system (e.g., chirping decoupling element 320, adding a lens as a component in the display assembly 305, and curving the display assembly, etc.) as further described below with regard to FIGS. 4-6. The source assembly 304 generates and outputs light 306 to a coupling element 310 located on the output waveguide 315. Source assembly 304, in one embodiment, includes a steering element 335 (e.g., MEMS, plurality of sources, liquid crystal prism, etc.) that changes at least one of the orientation or position of light 306 entering coupling element 310 to steer the output image light 326 toward the user's pupil in response to changes in the user's eye position, as captured by eye tracking sensor 210 shown in FIG. 2, and determined by an eye tracking system of NED 100. In one embodiment, changing the orientation or position of the light 306 includes changing the angle at which the light 306 is incident on coupling element 310 of the waveguide 315. Alternatively, the steering element 335 is separate from the source assembly 304, as described with regard to FIGS. 8A-8B.

The output waveguide 315 is an optical waveguide that outputs image light 326 to eye 322 of a user. The output waveguide 315 receives the light 306 at one or more coupling elements 310 located on output waveguide 315, and guides the received input image light to decoupling element 320. In some embodiments, the coupling element 310 couples the light 306 from the source assembly 304 into the output waveguide 320. The coupling element 310 may be, e.g., a diffraction grating, a holographic grating, one or more cascaded reflectors, one or more prismatic surface elements, an array of holographic reflectors, or some combination thereof.

The decoupling element 320 redirects the total internally reflected image light from the output waveguide 315 such that it may be decoupled from the output waveguide 315. The decoupling element 320 is part of, or affixed to, a first side of the output waveguide 315 and may be, e.g., a diffraction grating, or a holographic grating, one or more cascaded reflectors, one or more prismatic surface elements, an array of holographic reflectors. An orientation and position of the image light 326 exiting from the output waveguide 315 is controlled by changing an orientation and position of the light 306 entering the coupling element 310. In some configurations, the coupling element 310 couples the light 306 into the output waveguide 315 and the light 306 propagates along one dimension. The decoupling element 320 receives light 306 from the coupling element 310 covering a first portion of the first angular range emitted by the source assembly 304 and diffracts the received image light to another dimension. Note that the received image light is expanded in 2D until this state. The decoupling element 320 diffracts a 2-D expanded image light toward the SLM 325, which reflects the image light toward and through output waveguide 315 to target area 330 of exit pupil 324. Waveguide displays are further described in U.S. patent application Ser. No. 15/704,190, filed Sep. 14, 2017, which is incorporated by reference in its entirety.

The SLM 325 is configured to encode the expanded light out-coupled by the waveguide 315 using a hologram to create a wavefront of a virtual image. Thus, the SLM 325 encodes the light 306 using a hologram (computer generated) of a synthetic image, which is eventually decoded by the lens of the eye 322 and, when a user looks through at the hologram presented via display assembly 305, the eyes of the user converts the hologram to a reconstructed image of the synthetic image. The SLM 325 achieves this by modulating the incident light 306 using the hologram to form encoded light responsive to instructions received from the controller 302. The SLM 325 includes a plurality of addressable pixels that can modulate light amplitude, light phase, light polarization, or some combination thereof in 2 dimensions (i.e., x and y). The SLM 325, in this example, is reflective (however, in other embodiments, the SLM 320 may be transmissive) and the SLM 325 reflects the image light back toward and through output waveguide 315 where it is focused (e.g., by chirping the waveguide, adding a lens in the display assembly, curving the waveguide/display assembly, etc.) on target area 330 of exit pupil 324 as image light 326.

Additionally, while display assembly 205 shows a single SLM 325, it may be modified to have multiple SLMs 325 (e.g., one for light phase and another for light amplitude, or another phase SLM). Systems and methods for generating a hologram with an SLM are further described in U.S. patent application Ser. No. 14/983,109, filed Dec. 29, 2015, which is incorporated by reference in its entirety.

Focusing Image Light onto the Target Area

Figure 4:
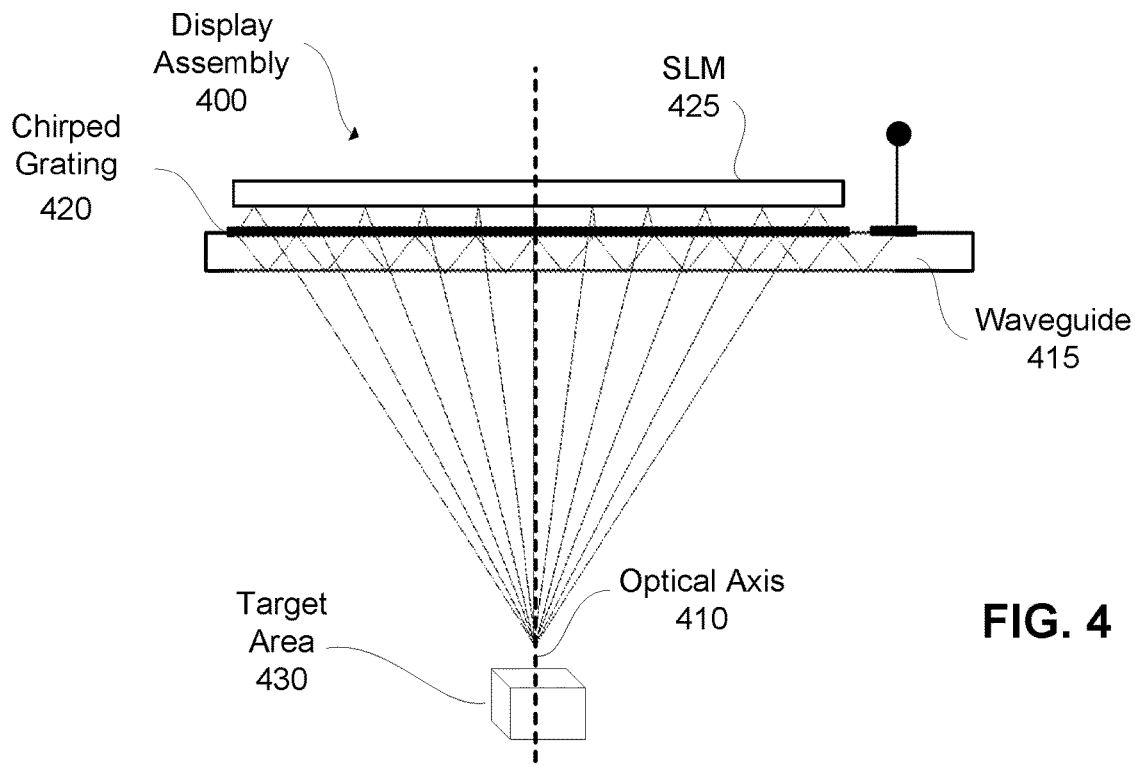
FIG. 4 illustrates a cross-section of a display assembly of an NED showing a chirped decoupling element for focusing image light on a target area of an exit pupil of the NED, in accordance with one embodiment.
Figure 5:
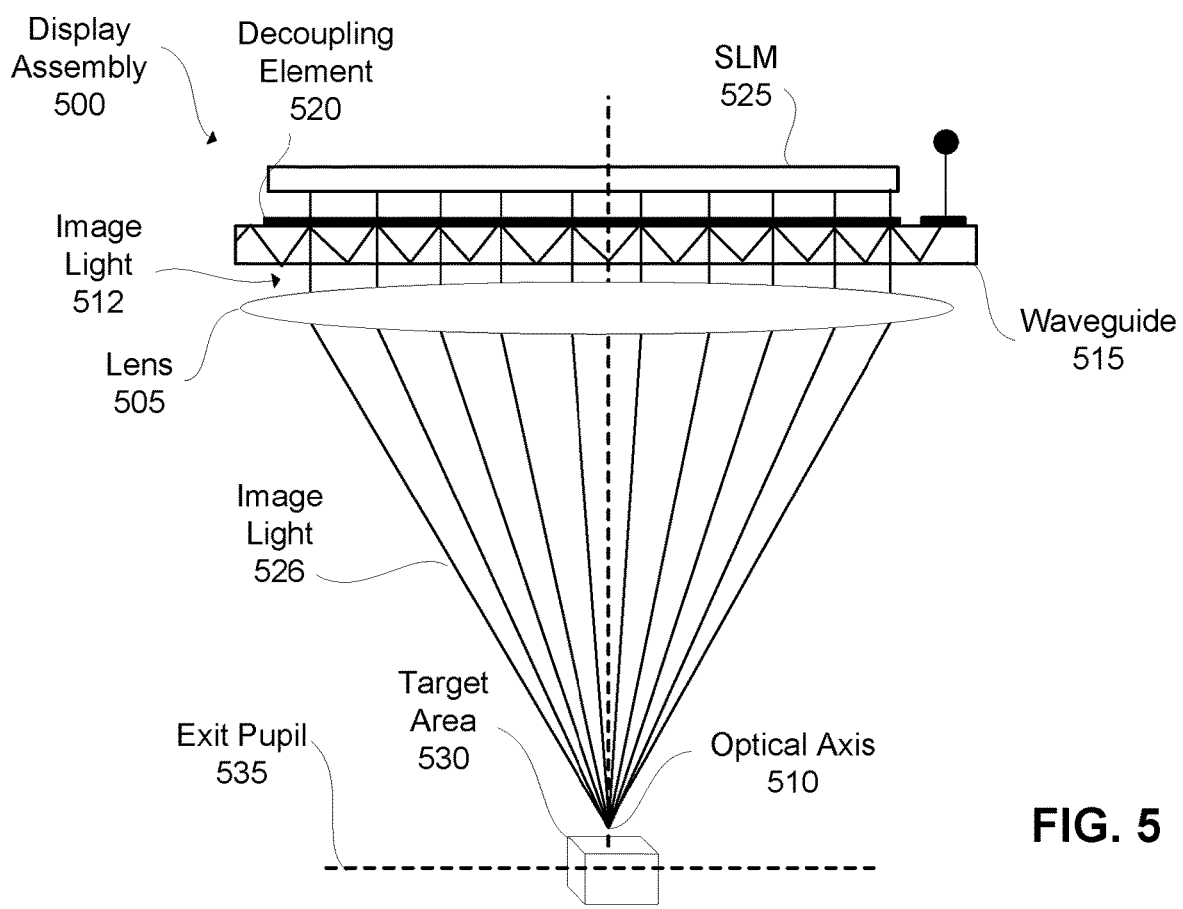
FIG. 5 illustrates a cross-section of a display assembly of an NED showing a lens as part of the display assembly for focusing image light on a target area of an exit pupil of the NED, in accordance with one embodiment.
Figure 6:
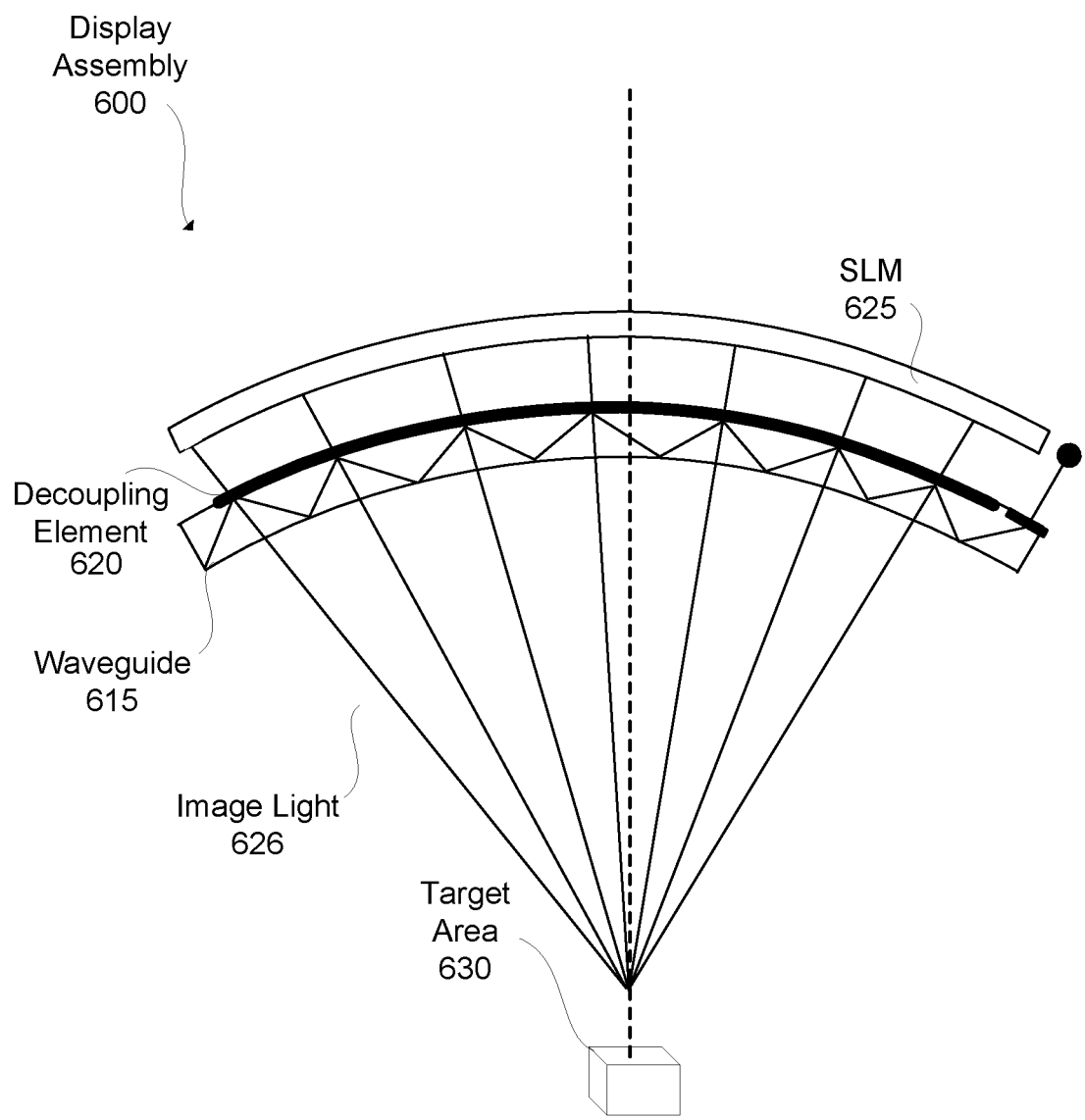
FIG. 6 illustrates a cross-section of a display assembly of an NED showing a curved display assembly for focusing image light on a target area of an exit pupil of the NED, in accordance with one embodiment.

Various configurations may be employed to focus the image light 326 onto target area 330 and FIGS. 4-6 illustrate a few such configurations that include chirping decoupling element 320, adding a lens as a component in the display assembly 205, and curving the display assembly 205.

FIG. 4 illustrates a cross-section of an NED that includes display assembly 400 with a chirped grating 420 for focusing image light onto the target area 430, in accordance with one embodiment. By using chirped grating 420, guided light can be decoupled and focused to a desired location (e.g., target area 430). The location and spot size of focused image light depends upon the size and chirp of the grating 420 as well as the wavelength of the light. Accordingly, the chirping of chirped grating 420 causes the image light to decouple from decoupling element 420 at an angle toward an optical axis 410 of the display assembly 400. In one embodiment, the chirping of grating 420 increases with distance away from optical axis 410 in order to cause the image light at edges of decoupling element to be bent or diffracted toward the optical axis 410 relative to the image light closer to the optical axis 410.

FIG. 5 illustrates a cross-section of a display assembly 500 showing a lens 505 as part of the display assembly 500, in accordance with one embodiment. As above, lens 505 is included in this embodiment to focus the image light on target area 530. As shown in FIG. 5, the rays of image light 512 exit waveguide 515 toward lens 505 are initially relatively straight. Lens 505 (e.g., positive lens, Fresnel lens, etc.) directs or focuses the image light 512 toward target area 530 by bending the image light 515 so that it exits lens 505 as image light 526 directed at target area 530.

As shown in FIG. 5, lens 505 is located between waveguide 515 and exit pupil 535; however, in an alternate configuration, lens 505 may be located between waveguide 515 and SLM 325. In this configuration, image light decoupled from waveguide 515 via decoupling element 520 would pass through the lens 505 to reach the SLM 525, would be reflected by the SLM 525 and then pass through the lens again prior to being output to the exit pupil 525. In this configuration the lens applies its optical power twice to the light, accordingly a lens of lower optical power may be used, which may decrease weight, cost, aberrations, etc.

FIG. 6 illustrates a cross-section of a portion of a curved display assembly 600 for an NED that focuses image light on target area 630, in accordance with one embodiment. In this example, waveguide 615, decoupling element 620, and SLM 625 are curved in order to direct the image light (or cause it to converge) target area 630. In one embodiment, the waveguide 615 is static and does not move. Alternatively, the waveguide 615 is coupled to one or more actuators. The actuators cause the waveguide 615 within the display assembly 600 to bend, thereby generating curvature in the waveguide 615. The curvature causes the emitted image light 626 to converge in one dimension (e.g., similar to a cylindrical lens). Accordingly, the actuators are able to vary a first focal dimension (i.e., a single dimension is focused) of the waveguide 615. The controller 302 determines an amount of actuation to occur based on a desired focus position for the first focal dimension.

Steering Image Light to the Target Area

As described above, a NED includes an SLM to recreate a wavefront of image light without the adverse effects of vergence-accommodation conflict. Moreover, by de-magnifying the eyebox to a target area roughly the size of a user's pupil, the FOV of an NED can be increased. However, given the resulting small eyebox or target area, small changes in the user's eye position cause the user's pupil to move off the target area (e.g., target area 330). To remedy this issue and make use of the positive effects of a small eyebox, the eye tracking system tracks the position of the pupil and a steering element (e.g., MEMS, plurality of sources, liquid crystal prism, etc.) effects changes to the image light that cause the image light to be directed to the tracked location of the pupil. Thus, in one embodiment, the pupil of the user's eye is the target area. However, in accordance with various embodiments, the size of the target area can be modified to be larger than the pupil to accommodate a desired FOV or to address operational latency, for example. Accordingly, FIGS. 7-9 show different example display assembly configurations for steering the image light to the target area. Each of the display assembly configurations described in FIGS. 7-9 are illustrated as being implemented with a chirped grating discussed with respect to FIG. 4; however, the display assembly configurations described in FIGS. 7-9 could alternatively, or in addition to be implemented with a lens, curved waveguide, or some combination thereof, as discussed with respect to FIGS. 4 and 5, or any other focusing method or configuration.

Figures 7A, 7B:
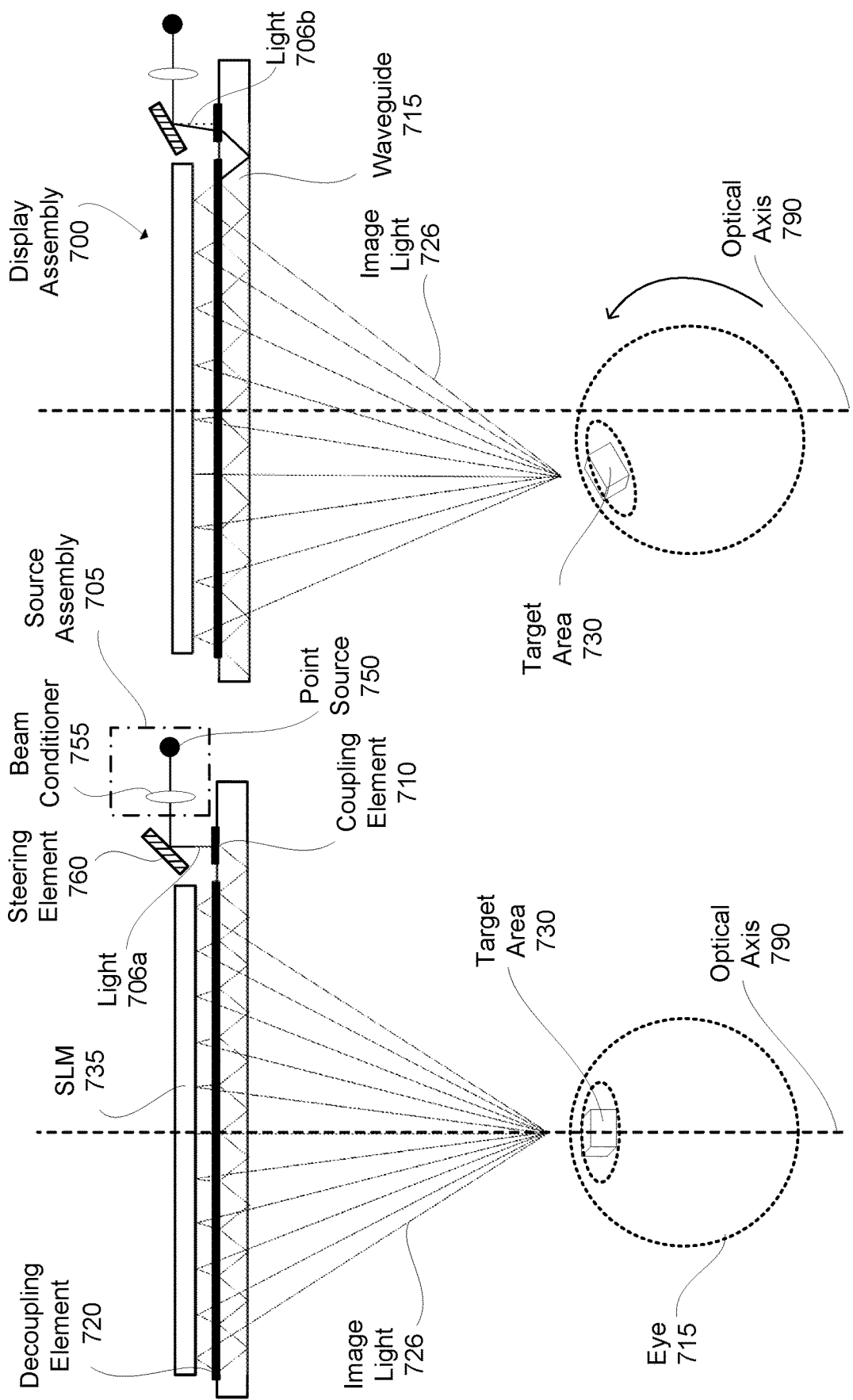
FIGS. 7A and 7B illustrate cross-sections of a display assembly of an NED showing one configuration for steering image light to a target area of an exit pupil of the NED, in accordance with one embodiment.

FIGS. 7A and 7B illustrate cross-sections of display assembly 700 showing one configuration for steering image light to target area 730, in accordance with one embodiment. In one embodiment, the display assembly 700 is an embodiment of display assembly 305 discussed with respect to FIG. 3. FIGS. 7A and 7B show the same cross section of display assembly 700 at different points in time with the user's eye in different positions. For example, FIG. 7A shows the eye 715 of a user in a first position where the gaze direction of the user is along the optical axis 790. FIG. 7B shows the eye 715 in a second position where the gaze angle is off-axis (i.e., at an angle relative to the optical axis 790).

FIGS. 7A and 7B show source assembly 705 comprising point source 750 and a beam conditioner 755. The beam conditioner 310 may include, for example, a beam expander, a collimator, a diffraction grating, one or more lenses, a spatial filter, an optical isolator, other optical elements, or some combination thereof. For example, an optical isolator may be used to prevent light from traveling back toward the point source 750. In the embodiment illustrated in FIG. 7 the beam conditioner 755 is a collimator, however, a different example of the beam conditioner 755 is discussed in detail below with regard to FIG. 8. Display assembly 700 additionally comprises a steering element 760 (e.g., MEMS, Liquid Crystal (LC) Prism, scanning mirror, etc.) to steer the image light to the target area 730. In one embodiment steering element 760 is an embodiment of steering element 335 discussed with respect to FIG. 3.

Accordingly, the point source 750 generates the light, the beam conditioner 755 collimates or otherwise conditions the light from the point source 750, and steering element 760 receives the collimated light and steers the light by changing at least one of the orientation or position of the image light to generate light 706a with the steered orientation and/or position before it is in-coupled into waveguide 715 by coupling element 710. The change in orientation or position applied to the light (i.e., light 706a) by steering element 760 causes the output image light 726 to be steered toward target area 730 in response to changes in the user's eye position, as shown in FIG. 7B. Thus, in FIG. 7A, the eye tracking system determines that the position of the user is substantially in-line with optical axis 790. The eye tracking system sends the determined position to controller 302. Controller 302 then provides instructions for steering element 760 to adjust at least one of the orientation or position of the image light for the determined position. As a result, the image light in-coupled into waveguide 715 via coupling element 710 has the orientation and position for focusing the image light on target area 730 for the determined position. In one embodiment, changing the orientation or position of the light includes changing the angle at which the light is incident on coupling element 710.

As the user rotates their eye (e.g., to look to their left), as shown in FIG. 7B, the location of the pupil shifts to the left relative to the optical axis 790, thereby, changing the location of target area 730. Accordingly, the eye tracking system tracks the location of the pupil to the new or updated position (i.e., to the left of optical axis 790 at roughly a 45 degree angle). The eye tracking system then sends the updated pupil position to controller 302 that provides instructions for steering element 760 to adjust at least one of the orientation or position of the light 706a to an updated orientation and/or position referred to in FIG. 7B as light 706b for the updated pupil position. As a result, the light 706b in-coupled into waveguide 715 via coupling element 710 has the updated orientation and/or position for focusing the image light 726 on target area 730 for the updated position.

In order to ensure that the image light 726 is directed to or hits the target area 730, different combinations of different orientations and/or positions of the image light (i.e., as manipulated or adjusted by steering element 760) are mapped to different eye or pupil positions. In one embodiment, this mapping is determined in a preprocessing step and the controller 302 stores this mapping (e.g., in a lookup table, etc.). Accordingly, in response to receiving eye tracking information from the eye tracking system for a particular eye or pupil position, the controller 302 retrieves the corresponding orientation and position for the light from the lookup table and sends instructions to steering element 760 to adjust the orientation and/or position of the light for that particular eye or pupil position. The steering element 760 then adjust the orientation and/or position of the light prior to the light being in-coupled into the waveguide 715 via coupling element 710. The adjusted orientation and/or position of the light then changes the angle at which image light 726 is out-coupled from decoupling element 720 in order to be steered toward the updated position of target area 730.

FIGS. 8A and 8B illustrate cross-sections of display assembly 800 showing one configuration for steering image light to target area 830, in accordance with one embodiment. In one embodiment, the display assembly 800 is an embodiment of display assembly 305 discussed with respect to FIG. 3. FIGS. 8A and 8B show the same cross section of display assembly 800 at different points in time with the user's eye in different positions. Thus, as above, FIG. 8A shows eye 815 in a first position where the gaze direction is on the optical axis 890. FIG. 8B shows the eye 815 in a second position where the gaze angle is off-axis or at an angle relative to the optical axis 890.

FIGS. 8A and 8B show source assembly 805 comprising source array 850 (e.g., an array of point sources, LEDs, etc.) and beam conditioner 855. In one embodiment source array 850 is an embodiment of steering element 335 discussed with respect to FIG. 3. The source array 850 includes, in one embodiment, an array (e.g., between 3×3 and 100×100) of point sources (e.g., pixels, LEDs, etc.) that generate the image light and, depending on which point sources in the array are illuminated, steers the image light being in-coupled into waveguide 815 by coupling element 810. Each point source in the array corresponds to a different angle of light incident on coupling element 810, which effects how the light is out-coupled by decoupling element 820. Accordingly, depending on the point source that is (or combination of point sources that are) illuminated in source array 850 causes directional changes of the output image light 826 upon being out-coupled by waveguide 815, thereby, steering the image light 826 toward target area 830 in response to changes in the user's eye position, as shown in FIG. 8B. Thus, in FIG. 8A, the eye tracking system determines that the position of the user's eye is substantially in-line with optical axis 890. The eye tracking system sends the determined position to controller 302. Controller 302 then provides instructions to source array 850 for illuminating at least one different pixel in order to steer the image light 826 to the target area 830 for the determined position. As shown in FIG. 8A for illustration purposes, the middle pixel of source array 850 is illuminated in order to steer the image light 826 to the target area on the optical axis 890. Then, as the user's eye rotates thereby changing the position of the target area 830 to a new updated position, as shown in FIG. 8B, source array 850 illuminates a different one or more pixels (i.e., the right pixel, in this example) to steer the image light 826 to the updated position of target area 830.

As discussed with respect to FIGS. 7A and 7B, in order to ensure that the image light 826 is directed to or hits the target area 830, the different steered locations of image light 826 (corresponding to the different eye or pupil positions) are each mapped to which point sources in the array are illuminated. As above, this mapping can be determined in a preprocessing step and the controller 302 stores this mapping (e.g., in a lookup table, etc.). Accordingly, in response to receiving eye tracking information from the eye tracking system for a particular eye or pupil position, the controller 302 retrieves the corresponding one or more point sources to illuminate rom the lookup table and sends instructions to source array 850 to illuminate these point sources of the array for that particular eye or pupil position. The corresponding one or more point sources, when illuminated prior to being in-coupled into the waveguide 815 via coupling element 810, cause the image light 826 out-coupled from decoupling element 820 to be steered toward the updated position of target area 830.

Figure 9B:
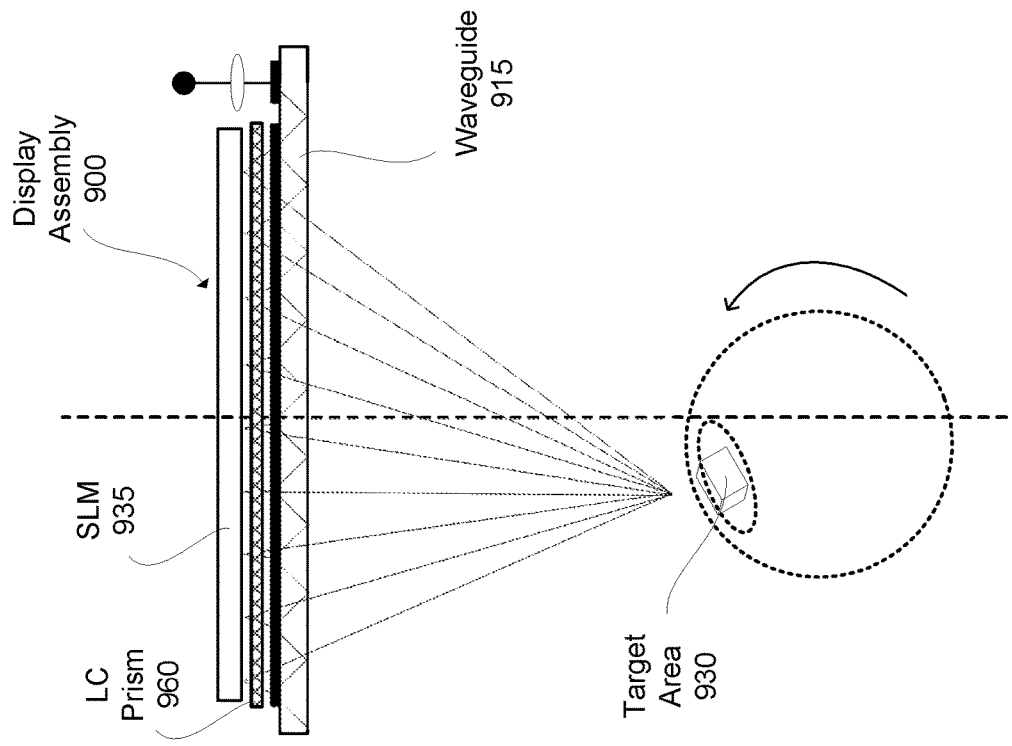
FIGS. 9A and 9B illustrate another set of cross-sections of a display assembly of an NED showing another configuration for steering image light to a target area of an exit pupil of the NED, in accordance with one embodiment.
Figure 9A:
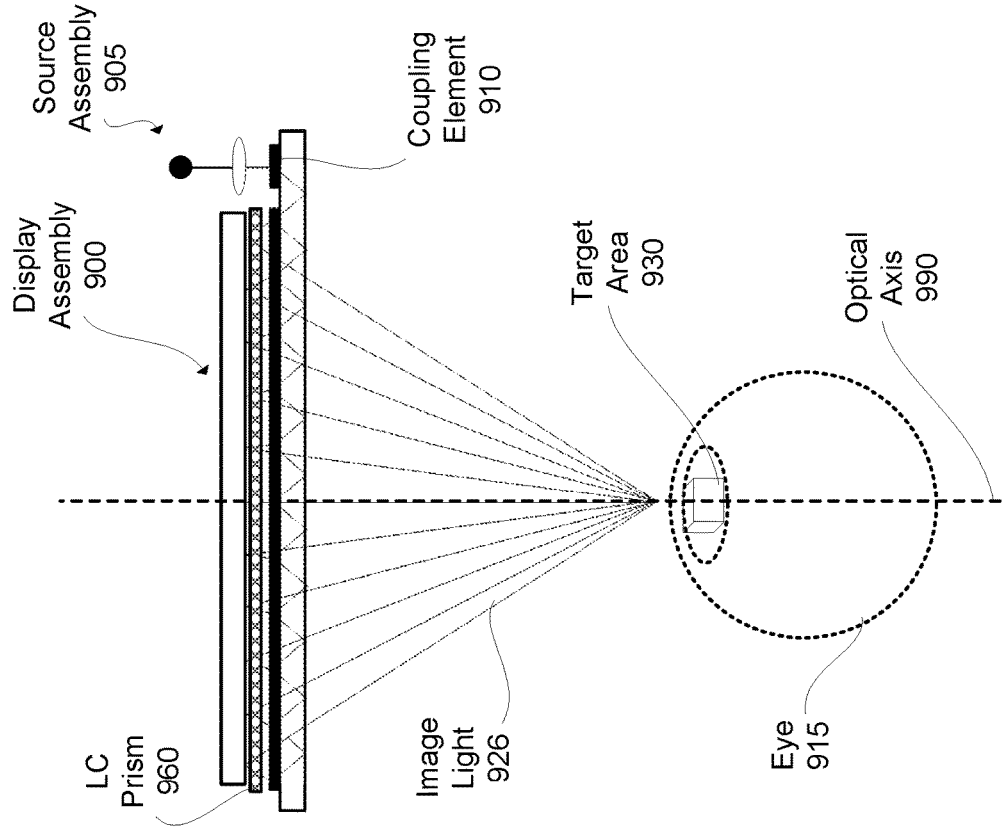

FIGS. 9A and 9B illustrate cross-sections of a display assembly 900 of an NED with a Liquid Crystal (LC) prism 960 as part of display assembly 900 for steering image light to a target area 930 of an exit pupil of the NED, in accordance with one embodiment. In one embodiment, the display assembly 900 is an embodiment of display assembly 305 discussed with respect to FIG. 3 and LC prism 960 is an embodiment of steering element 335. Similar to FIGS. 7-8, FIGS. 9A and 9B show the same cross section of display assembly 900 at different points in time with the user's eye in different positions. Accordingly, FIG. 9A shows eye 915 in a first position where the gaze direction is on the optical axis 990. FIG. 9B shows the eye 915 in a second position where the gaze angle is off-axis or at an angle relative to the optical axis 990.

FIGS. 9A and 9B show source assembly 905 separate from the steering element which is LC prism 960. In this embodiment, LC prism receives the image light out-coupled from waveguide 915 and steers the image light to the target area 930. Accordingly, the source assembly 905 generates the image light, the image light is in-coupled into waveguide 915 via coupling element 910, out-coupled by an output grating of waveguide 915 to LC prism 960. The LC prism 960 steers the image light (e.g., via a patterned electrode of LC prism 960 having refractive shapes), in this embodiment, before the image light is received by SLM 935. Alternatively, the image light could be received by SLM 935 prior to being steered by LC prism 960.

Accordingly, in FIG. 9A, the eye tracking system determines that the position of the user's eye is substantially in-line with optical axis 990. The eye tracking system sends the determined position to controller 302. Controller 302 then provides instructions to LC prism 960 to steer the image light 926 to the target area 930 for the determined eye position. Then, as the user's eye rotates thereby changing the position of the target area 930 to a new updated position, as shown in FIG. 9B, LC prism 960 steers the image light 926 to the updated position of target area 930.

System Overview

Figure 10:
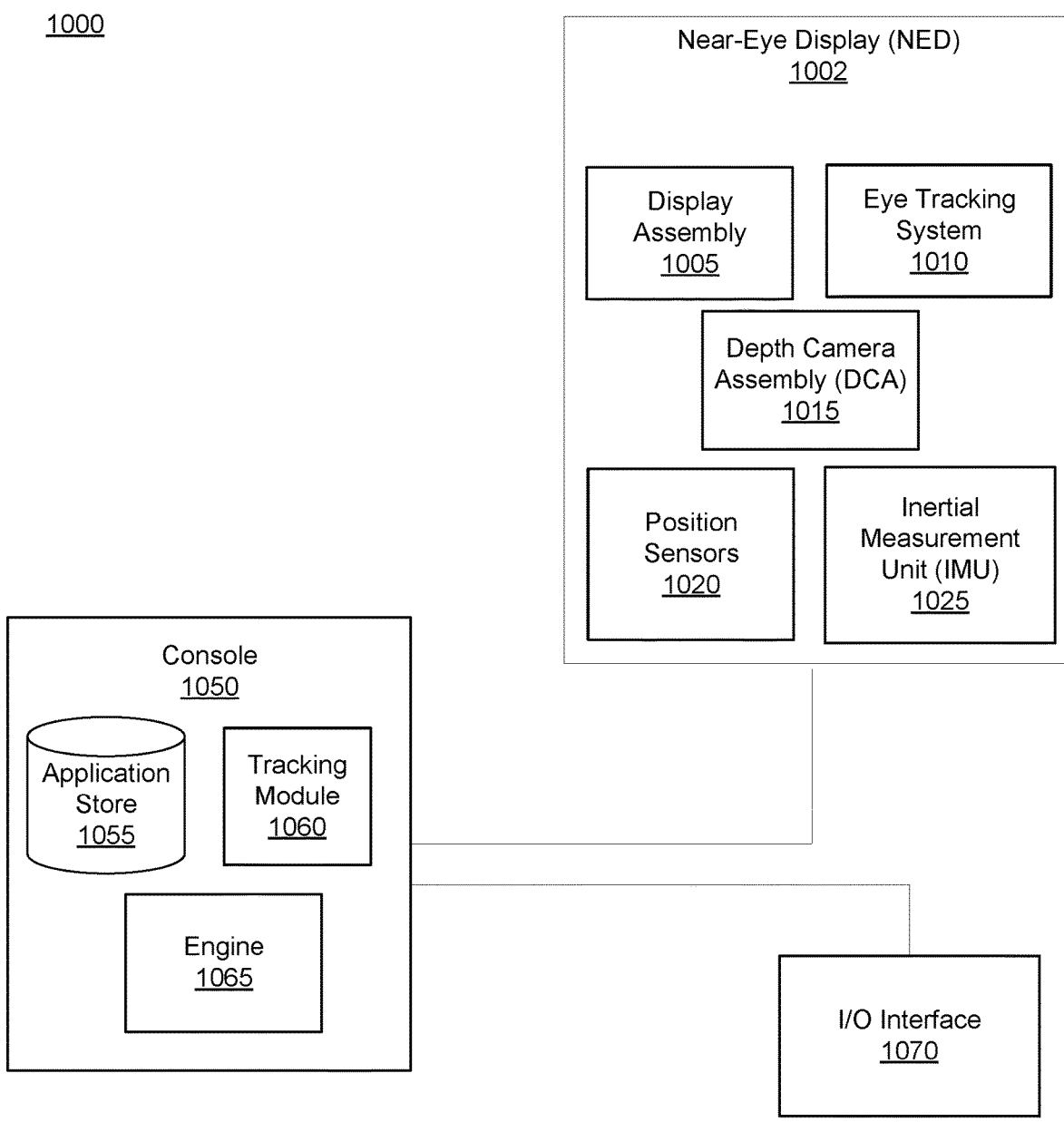
FIG. 10 is a block diagram of a system including the NED of FIG. 1, in accordance with an embodiment.

FIG. 10 is a block diagram of a system 1000 including NED 10002, in accordance with an embodiment. It should be understood that NED 100 of FIG. 1 could be the same as NED 1002 described herein with respect to FIG. 10. The system 100 comprises the NED 1002 and an input/output interface 1070 that are each coupled to the console 1050. While FIG. 10 shows an example system 1000 including one NED 1002 and one input/output interface 1070, in other embodiments, any number of these components may be included in the system 1000. For example, there may be multiple NEDs 1002 each having an associated input/output interface 1070 communicating with the console 1050. In alternative configurations, different and/or additional components may be included in the system 1000. Similarly, functionality of one or more of the components can be distributed among the components in a different manner than is described here. For example, some or all of the functionality of the console 1050 may be contained within the NED 1002. Additionally, in some embodiments the system 1000 may be modified to include other system environments, such as an AR system environment and/or a mixed reality (MR) environment.

The NED 1002 is a near-eye display that presents media to a user. Examples of media presented by the NED 1002 include one or more images, video, audio, or some combination thereof. In some embodiments, audio is presented via an external device (e.g., speakers and/or headphones) that receives audio information from the NED 1002, the console 1050, or both, and presents audio data based on the audio information. In some embodiments, the NED 1002 may also act as an AR eye-wear glass. In these embodiments, the NED 1002 augments views of a physical, real-world environment with computer-generated elements (e.g., images, video, sound, etc.). NED 1002 includes display assembly 1005, an eye tracking system 1010, depth camera assembly (DCA) 1015, one or more position sensors 1020, and the inertial measurement unit (IMU) 1025. The display assembly 1005 includes the source assembly 304, steering element 335, coupling element 310, the output waveguide 315, decoupling element 320, SLM 325, and the controller 302 of FIG. 3, as discussed above.

Display assembly 1005 of NED 1002 includes a controller, a source assembly, an output waveguide, a steering element, and a spatial light modulator. The source assembly generates light and includes an optical source (e.g., laser diode, a vertical cavity surface emitting laser, a light emitting diode, such as uLED, SLED, etc., a tunable laser, or some other light source that emits coherent or partially coherent light, etc.), and an optical system (e.g., chirping decoupling element, adding a lens as a component in the display assembly 305, and curving the display assembly, etc.). The source assembly generates and outputs light to a coupling element located on the output waveguide. Display assembly 1005, in one embodiment, includes a steering element (e.g., MEMS, plurality of sources, liquid crystal prism, etc.) that changes at least one of the orientation or position of light entering coupling element to steer the output image light toward the user's pupil in response to changes in the user's eye position, as captured by eye tracking sensor of eye tracking system 1010.

Display assembly 1005 includes an output waveguide that is an optical waveguide that outputs image light to eye of a user. The output waveguide receives the light at one or more coupling elements located on output waveguide, and guides the received input image light to decoupling element. In some embodiments, the coupling element couples the light from the source assembly into the output waveguide. The decoupling element redirects the total internally reflected image light from the output waveguide such that it may be decoupled from the output waveguide. An orientation and position of the image light exiting from the output waveguide is controlled by changing an orientation and position of the light entering the coupling element. In some configurations, the coupling element couples the light into the output waveguide and the light propagates along one dimension. The decoupling element receives light from the coupling element covering a first portion of the first angular range emitted by the source assembly and diffracts the received image light to another dimension. Note that the received image light is expanded in 2D until this state. The decoupling element diffracts a 2-D expanded image light toward the SLM, which reflects the image light toward and through output waveguide to target area of exit pupil. The SLM is configured to encode the expanded light out-coupled by the waveguide using a hologram to create a wavefront of a virtual image. Thus, the SLM encodes the light using a hologram (computer generated) of a synthetic image, which is eventually decoded by the lens of the eye and, when a user looks through at the hologram presented via display assembly 1005, the eyes of the user converts the hologram to a reconstructed image of the synthetic image. The SLM achieves this by modulating the incident light using the hologram to form encoded light responsive to instructions received from the controller.

Eye tracking system 1010 tracks an eye position and eye movement of a user of NED 1102. A camera or other optical sensor inside NED 1002 captures image information of a user's eyes, and eye tracking module 1010 uses the captured information to determine, for example, interpupillary distance, interocular distance, a three-dimensional (3D) position of each eye relative to NED 1002, including a magnitude of torsion and rotation (i.e., roll, pitch, and yaw) and gaze directions for each eye.

In one example, infrared light is emitted within NED 1002 and reflected from each eye. The reflected light is received or detected by the camera and analyzed to extract eye rotation from changes in the infrared light reflected by each eye. Many methods for tracking the eyes of a user can be used by eye tracking module 1010. Accordingly, eye tracking module 1010 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, eye tracking module 1010 integrates information from past measurements, measurements identifying a position of a user's head, and 3D information describing a scene presented by display assembly 1005.

The DCA 1015 captures data describing depth information of a local area surrounding some or all of the near-eye-display 1002. The DCA 1015 can compute the depth information using the data (e.g., based on a captured portion of a structured light pattern), or the DCA 1015 can send this information to another device such as the console 1050 that can determine the depth information using the data from the DCA 1015.

The DCA 1015 includes a light generator, an imaging device and a controller. The light generator of the DCA 1015 is configured to illuminate the local area with illumination light in accordance with emission instructions. The imaging device of the DCA 1015 includes a lens assembly, a filtering element and a detector. The lens assembly is configured to receive light from a local area surrounding the imaging device and to direct at least a portion of the received light to the detector. The filtering element may be placed in the imaging device within the lens assembly such that light is incident at a surface of the filtering element within a range of angles, wherein the range of angles is determined by a design range of angles at which the filtering element is designed to filter light. The detector is configured to capture one or more images of the local area including the filtered light. In some embodiments, the lens assembly generates collimated light using the received light, the collimated light composed of light rays substantially parallel to an optical axis. The surface of the filtering element is perpendicular to the optical axis, and the collimated light is incident on the surface of the filtering element. The filtering element may be configured to reduce an intensity of a portion of the collimated light to generate the filtered light. The controller of the DCA 1015 generates the emission instructions and provides the emission instructions to the light generator. The controller of the DCA 1015 further determines depth information for the one or more objects based in part on the captured one or more images.

The IMU 1025 is an electronic device that generates data indicating a position of the NED 1002 based on measurement signals received from one or more of the position sensors 1020 and from depth information received from the DCA 1015. A position sensor 1020 generates one or more measurement signals in response to motion of the NED 1002. Examples of position sensors 1020 include: one or more accelerometers, one or more gyroscopes, one or more magnetometers, another suitable type of sensor that detects motion, a type of sensor used for error correction of the IMU 1025, or some combination thereof. The position sensors 1020 may be located external to the IMU 1025, internal to the IMU 1025, or some combination thereof.

The IMU 1025 is an electronic device that generates fast calibration data indicating an estimated position of the NED 1002 relative to an initial position of the NED 100 based on measurement signals received from one or more of the position sensors 1020. A position sensor 1020 generates one or more measurement signals in response to motion of the NED 1020. Examples of position sensors 1020 include: one or more accelerometers, one or more gyroscopes, one or more magnetometers, a suitable type of sensor that detects motion, a type of sensor used for error correction of the IMU 1025, or some combination thereof. The position sensors 1020 may be located external to the IMU 1025, internal to the IMU 1025, or some combination thereof. In the embodiment shown by FIG. 10, the position sensors 1020 are located within the IMU 1025, and neither the IMU 1025 nor the position sensors 1020 are visible to the user (e.g., located beneath an outer surface of the NED 1002).

Based on the one or more measurement signals generated by the one or more position sensors 1020, the IMU 1025 generates fast calibration data indicating an estimated position of the NED 1002 relative to an initial position of the NED 1002. For example, the position sensors 1020 include multiple accelerometers to measure translational motion (forward/back, up/down, left/right) and multiple gyroscopes to measure rotational motion (e.g., pitch, yaw, roll). In some embodiments, the IMU 1025 rapidly samples the measurement signals from various position sensors 1020 and calculates the estimated position of the NED 1002 from the sampled data. For example, the IMU 1025 integrates the measurement signals received from one or more accelerometers over time to estimate a velocity vector and integrates the velocity vector over time to determine an estimated position of a reference point on the NED 1002. The reference point is a point that may be used to describe the position of the NED 1002. While the reference point may generally be defined as a point in space; however, in practice, the reference point is defined as a point within the NED 1002.

The input/output interface 1070 is a device that allows a user to send action requests to the console 1050. An action request is a request to perform a particular action. For example, an action request may be to start or end an application or to perform a particular action within the application. The input/output interface 1070 may include one or more input devices. Example input devices include: a keyboard, a mouse, a game controller, or any other suitable device for receiving action requests and communicating the received action requests to the console 1050. An action request received by the input/output interface 1070 is communicated to the console 1050, which performs an action corresponding to the action request. In some embodiments, the input/output interface 1070 may provide haptic feedback to the user in accordance with instructions received from the console 1050. For example, haptic feedback is provided when an action request is received, or the console 1050 communicates instructions to the input/output interface 1070 causing the input/output interface 1070 to generate haptic feedback when the console 1050 performs an action.

The console 1050 provides media to the NED 1002 for presentation to the user in accordance with information received from one or more of: the imaging device 1035, the NED 100, and the input/output interface 1070. In the example shown in FIG. 10, the console 1050 includes an application store 1055, a tracking module 1050, and an engine 1065. Some embodiments of the console 1050 have different modules than those described in conjunction with FIG. 10. Similarly, the functions further described below may be distributed among components of the console 1050 in a different manner than is described here.

The application store 1055 stores one or more applications for execution by the console 1050. An application is a group of instructions, that when executed by a processor, generates content for presentation to the user. Content generated by an application may be in response to inputs received from the user via movement of the NED 1002 or the input/output interface 1070. Examples of applications include: gaming applications, conferencing applications, video playback application, or other suitable applications.

The tracking module 1060 calibrates the system 1000 using one or more calibration parameters and may adjust one or more calibration parameters to reduce error in determination of the position of the NED 1002. Moreover, calibration performed by the tracking module 1050 also accounts for information received from the IMU 1025.

The tracking module 1050 also determines positions of a reference point of the NED 1002 using position information from the fast calibration information. Additionally, in some embodiments, the tracking module 1050 may use portions of the fast calibration information, the slow calibration information, or some combination thereof, to predict a future location of the NED 1002. The tracking module 1050 provides the estimated or predicted future position of the NED 1002 to the engine 1065.

The engine 1065 executes applications within the system 1000 and receives position information, acceleration information, velocity information, predicted future positions, or some combination thereof of the NED 1002 from the tracking module 1050. In some embodiments, the information received by the engine 1065 may be used for producing a signal (e.g., display instructions) to the display assembly 1005 that determines the type of content presented to the user. For example, if the received information indicates that the user has looked to the left, the engine 1065 generates content for the NED 1002 that mirrors the user's movement in a virtual environment by determining the type of source and the waveguide that must operate in the display assembly 1015. For example, the engine 1055 may produce a display instruction that would cause the display assembly 1015 to generate content with red, green, and blue color. Additionally, the engine 1065 performs an action within an application executing on the console 1050 in response to an action request received from the input/output interface 1070 and provides feedback to the user that the action was performed. The provided feedback may be visual or audible feedback via the NED 1002 or haptic feedback via the input/output interface 1070.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A near-eye display (NED) comprising:
an eye tracking system configured to generate eye tracking information that describes a location of a pupil of a user wearing the NED; and
a display assembly including:
   a light source configured to emit light;
   a waveguide configured to expand the light in at least one dimension and out-couple the expanded light;
   a spatial light modulator (SLM) configured to encode the expanded light out-coupled by the waveguide using a hologram to create a wavefront of a virtual image;
   a steering element configured to:
      direct the wavefront to a pupil sized target area of an eyebox of the NED corresponding to the location of the pupil based on the eye tracking information based on the location of the pupil determined by the eye tracking system;
      adjust the directed location of the wavefront responsive to the location of the pupil changing, as determined by the eye tracking system; and wherein the waveguide comprises a chirped grating configured to focus the steered wavefront on the pupil sized target area corresponding to the location of the pupil determined by the eye tracking system.

2. The NED of claim 1, wherein the steering element comprises:
a collimator configured to receive and collimate the light emitted from the light source, wherein the light source is a point source; and
a steering element configured to receive the collimated light from the collimator and adjust an angle of the collimated light for in-coupling into the waveguide, wherein adjusting the angle of the collimated light changes a direction of the light of the wavefront out-coupled from the waveguide in order to direct the wavefront to the pupil sized target area.

3. The NED of claim 1, wherein the light source is a source array comprising a plurality of pixels and the steering element includes the source array and a projector lens, wherein the steering element steers the wavefront to the pupil sized target area by illuminating different pixels of the plurality of pixels of the source array.

4. The NED of claim 1, wherein the steering element comprises: a liquid crystal prism configured to direct the wavefront to the pupil sized target area based on the location of the pupil determined by the eye tracking system.

5. The NED of claim 1, wherein the waveguide is curved to focus the steered wavefront on the pupil sized target area corresponding to the location of the pupil determined by the eye tracking system.

6. The NED of claim 1, wherein the display assembly further includes:
a lens configured to focus the steered wavefront on the pupil sized target area corresponding to the location of the pupil determined by the eye tracking system.

7. The NED of claim 1, wherein the pupil sized target area corresponding to the location of the pupil is between 1.0 mm and 3.0 mm in diameter.

8. A near-eye display (NED) comprising:
an eye tracking system configured to generate eye tracking information that describes a location of a pupil of a user wearing the NED; and
a display assembly including:
a light source configured to emit light;
a waveguide configured to expand the light in at least one dimension and out-couple the expanded light;
a spatial light modulator (SLM) configured to encode the expanded light using a hologram to create a wavefront of a virtual image; and
a steering element configured to:
receive the eye tracking information from the eye tracking system,
receive the image light from the light source,
adjust, based on the eye tracking information, the light received from the light source to steer the wavefront of the virtual image to a pupil sized target area of an eyebox of the NED, the pupil sized target area corresponding to the location of the pupil of the user as the pupil of the user moves;
provide the adjusted light to be in-coupled to the waveguide, wherein adjusting the light causes the wavefront to be directed to the pupil sized target area as a position of the pupil changes; and
wherein the waveguide comprises a chirped grating configured to focus the steered wavefront on the pupil sized target area.

9. The NED of claim 8, wherein the steering element comprises:
a collimator configured to receive and collimate the light emitted from the light source, wherein the light source is a point source; and
a steering element configured to receive the collimated light from the collimator and adjust at least one of the position or orientation of the collimated light for in-coupling into the waveguide, wherein adjusting at least one of the position or orientation of the collimated light changes a direction of the light of the wavefront out-coupled from the waveguide in order to direct the wavefront to the pupil sized target area.

10. The NED of claim 8, wherein the light source is a source array comprising a plurality of pixels and the steering element includes the source array and a projector lens, wherein the steering element adjusts the light causing the wavefront to be directed to the pupil sized target area by illuminating different pixels of the plurality of pixels of the source array.

11. The NED of claim 8, wherein the waveguide is curved to focus the wavefront on the pupil sized target area.

12. The NED of claim 8, wherein the display assembly further includes:
a lens configured to focus the wavefront on the pupil sized target area.

13. The NED of claim 8, wherein the pupil sized target area is between 1.0 mm and 3.0 mm in diameter.

14. A near-eye display (NED) comprising:
an eye tracking system configured to generate eye tracking information that describes a location of a pupil of a user wearing the NED; and
a display assembly including:
a light source configured to emit light;
a waveguide configured to expand the light in at least one dimension and out-couple the expanded light;
a spatial light modulator (SLM) configured to encode the expanded light using a hologram to create a wavefront of a virtual image; and
a steering element configured to:
receive the eye tracking information from the eye tracking system,
receive the expanded light out-coupled by the waveguide, and
adjust the expanded light to steer the wavefront of the virtual image to a pupil sized target area of an eyebox of the NED, the pupil sized target area corresponding to the location of the pupil of the user as the pupil of the user moves based on the eye tracking information; and
wherein the waveguide comprises a chirped grating configured to focus the steered wavefront on the pupil sized target area corresponding to the location of the pupil determined by the eye tracking system.

15. The NED of claim 14, wherein the pupil sized target area corresponding to the location of the pupil is between 1.0 mm and 3.0 mm in diameter.

16. The NED of claim 14, wherein the steering element comprises:
a liquid crystal prism configured to direct the wavefront to the pupil sized target area based on the location of the pupil determined by the eye tracking system.

17. The NED of claim 16, wherein the liquid crystal prism is positioned between the SLM and the chirped grating of the waveguide in the display assembly.

* * * * *